United States Patent
Harsch

(10) Patent No.: US 7,406,061 B2
(45) Date of Patent: *Jul. 29, 2008

(54) METHOD TO SUSTAIN TCP CONNECTION

(75) Inventor: Thomas B. Harsch, Stow, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 11/459,593

(22) Filed: Jul. 24, 2006

(65) Prior Publication Data
US 2007/0058599 A1 Mar. 15, 2007

Related U.S. Application Data

(63) Continuation of application No. 09/822,104, filed on Mar. 30, 2001, now Pat. No. 7,088,698, which is a continuation of application No. 08/841,464, filed on Apr. 22, 1997, now Pat. No. 6,212,175.

(51) Int. Cl.
*H04Q 7/00* (2006.01)
*H04Q 7/20* (2006.01)
*H04L 12/28* (2006.01)

(52) U.S. Cl. .................. 370/328; 370/401; 455/450
(58) Field of Classification Search ................ 370/328, 370/338, 349, 401; 455/343, 422, 450, 455, 455/466
See application file for complete search history.

(56) References Cited

U.S. PATENT DOCUMENTS

| | | | |
|---|---|---|---|
| 4,635,187 A * | 1/1987 | Baron et al. ................. | 718/100 |
| 4,698,748 A | 10/1987 | Juzswik et al. | |
| 4,713,029 A | 12/1987 | Ford | |
| 5,430,709 A | 7/1995 | Galloway | |
| 5,495,480 A | 2/1996 | Yoshida | |
| 5,553,074 A * | 9/1996 | Acampora ................... | 370/349 |
| 5,553,239 A | 9/1996 | Heath et al. | |
| 5,566,225 A * | 10/1996 | Haas ........................... | 455/423 |
| 5,682,379 A * | 10/1997 | Mahany et al. .............. | 370/311 |
| 5,737,404 A * | 4/1998 | Segal .......................... | 379/230 |
| 5,768,531 A * | 6/1998 | Lin ............................. | 709/242 |
| 5,848,064 A | 12/1998 | Cowan | |
| RE36,056 E | 1/1999 | Nonami | |
| 5,881,101 A * | 3/1999 | Furman et al. .............. | 375/217 |
| 5,995,726 A * | 11/1999 | Dillon ........................ | 709/231 |

(Continued)

Primary Examiner—Wing F. Chan
Assistant Examiner—Hong Sol Cho
(74) Attorney, Agent, or Firm—Amin, Turocy & Calvin, LLP

(57) ABSTRACT

The present invention relates to network communication systems for managing client/server connections in a wireless environment. In accordance with the invention, a mobile communication unit (i.e., client), deploys keepalive packets at selected times in order to reset a keepidle timer of a server (e.g., host computer). By periodically resetting the keepidle timer a current connection between the mobile communication unit and server can be maintained as long as desired even when the mobile communication unit is in a power suspend mode. When in a power suspend mode, the mobile communication unit can briefly awake long enough to activate its transmitter and send a keepalive packet to the server to maintain the current connection. In this manner, the mobile communication unit can obtain the power savings of being in primarily a power suspend mode, but still prevent the current connection from timing out.

19 Claims, 9 Drawing Sheets

U.S. PATENT DOCUMENTS 6,212,175 B1 * 4/2001 Harsch ................. 370/338
6,538,988 B1 * 3/2003 Natarajan et al. ........... 370/216
6,597,700 B2 * 7/2003 Golikeri et al. ............. 370/401
6,643,289 B1 * 11/2003 Natanson et al. ......... 370/395.2

* cited by examiner

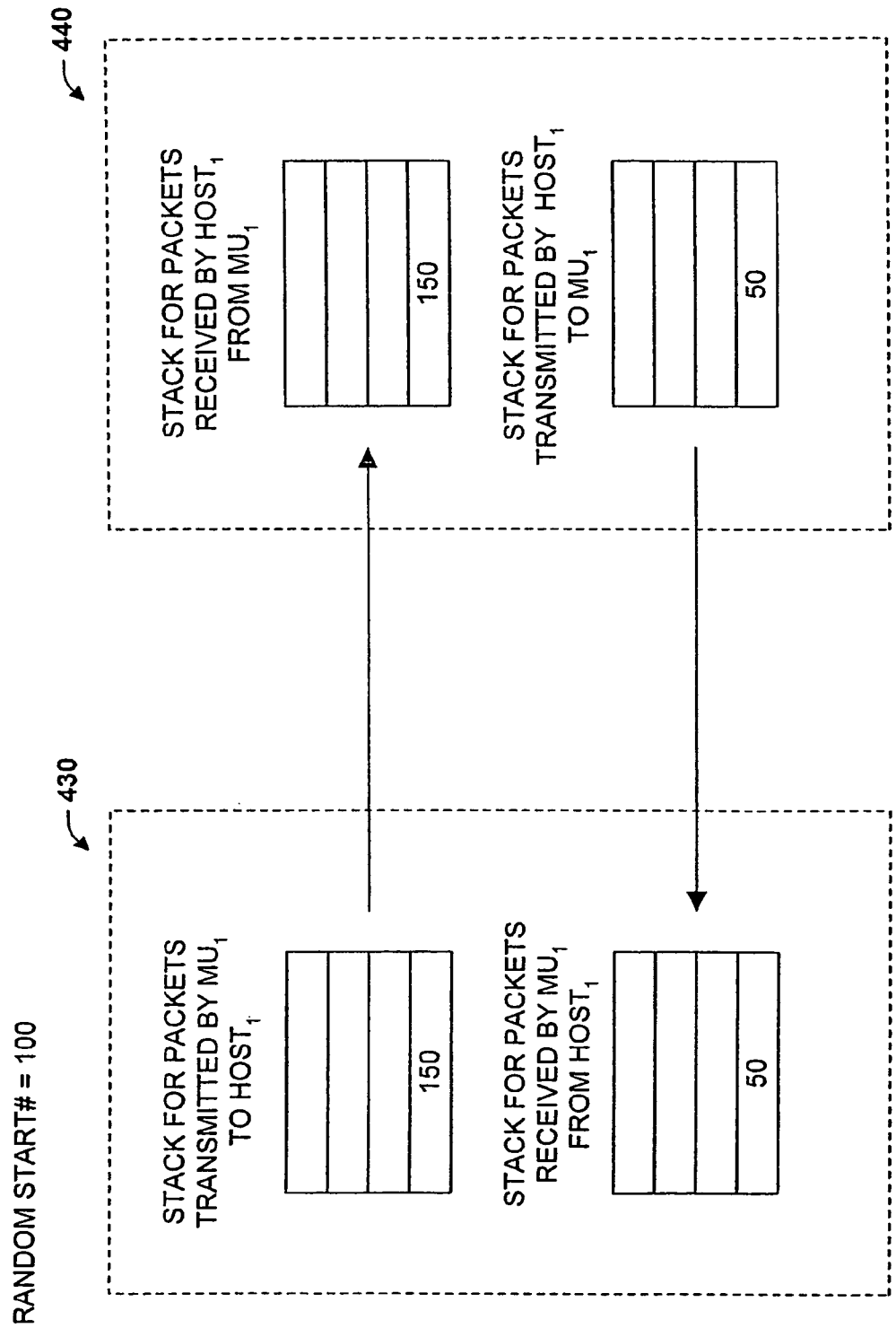

METHOD TO SUSTAIN TCP CONNECTION

CROSS-REFERENCE TO RELATED APPLICATIONS

This is a continuation of U.S. patent application Ser. No. 09/822,104 filed on Mar. 30, 2001, which is a continuation of U.S. patent application Ser. No. 08/841,464 filed Apr. 22, 1997 (now issued as U.S. Pat. No. 6,212,175, issued Apr. 3, 2001). The entireties of these applications are incorporated herein by reference.

TECHNICAL FIELD

The present invention relates generally to network communication systems, such as local area networks (LANs), and more particularly to managing client/server connections in a wireless environment.

BACKGROUND OF THE INVENTION

In recent years, the use of communication systems having wireless mobile communication units which communicate using an optical or radio link with a hardwired network, such as a local area network (LAN), has become quite widespread. Retail stores and warehouses, for example, may use such systems to track inventory and replenish stock. Employees may enter inventory information using a hand held or portable communication unit which can be carried through the store or warehouse. In manufacturing facilities, such systems are useful for tracking parts, completed products and defects. In a medical environment, these systems can reduce the time needed to fill out forms and eliminate inaccuracies by allowing medical personnel to transmit data directly from a mobile communication unit carried by the medical personnel.

A conventional communication system generally includes a number of fixed base stations (i.e. access points) interconnected by a medium to form a network backbone. The network backbone may be wireless in nature or be a hardwired connection formed using a twisted pair cable or shielded coaxial cable for fiber optic lines, for example. Each base station has a service area or cell surrounding the base station within which it has the ability to transmit and to receive relatively error-free data from a mobile communication unit within the area.

In such a network, a mobile communication unit must initially register itself with a base station and then attempt to begin a session with a host computer whereby the host computer allows communication to occur between itself and the particular mobile communication unit. More particularly, when a mobile communication unit is powered up, it "registers" with a base station. However, as the location of this mobile communication unit changes, the mobile communication unit may register with another base station, thereby resulting in a deregistration with the previous base station. Furthermore, deregistration will sometimes occur if there is no communication between the mobile communication unit and its corresponding base station within a predetermined period of time. Thus, in such communication systems, mobile communication units register and deregister frequently as the mobile communication units are moved about.

Each mobile communication unit within the communication system must also begin a connection with a server such as a host computer (or other device which provides application or information based services) once it has registered with a base station. A connection is established to allow the mobile communication unit and server to communicate using a known protocol such as TCP/IP. Following a connection being established, a user of the mobile communication unit is typically prompted to login and begin a session with that particular server. A session is typically only initiated once at start up by each mobile communication unit and is active until such time as the mobile communication unit or server ends the session regardless of the number of registrations and deregistrations which may have taken place with respect to base stations during this period. In order for the mobile communication unit to enter into the system and begin a session with the server, the mobile communication unit must have a unique network identification code (ID). The ID allows the server or other device on the backbone handling session requests to recognize and distinguish each mobile communication unit.

One widely accepted computer architecture, developed specifically to accommodate the above-mention distributed computing environment is the client-server model. The client-server system in general consists of the server which services the requests of a large number of smaller computers (e.g.,mobile communication units), or clients, that connect to it. The mobile communication units do not typically communicate with each other, but rather only exchange data with the server, which thereby acts as a clearinghouse for mobile communication unit requests and inter mobile communication unit communications.

In order to ensure proper routing of messages between the server and an intended mobile communication unit, the messages are initially broken up into data packets, each of which receive a destination address according to a consistent protocol, and which are reassembled upon receipt by the target computer. The exchange of information between endpoints in a packet network is achieved via a "protocol." A commonly accepted protocol for this purpose is the Internet Protocol (IP), which provides for networking. Used in conjunction with the IP may be a Transmission Control Protocol (TCP) which provides for a reliable stream delivery of messages or a User Datagram Protocol (UDP) which allows for distinguishing messages among multiple destinations with a given host computer.

More specifically, the TCP protocol is a popular connection-oriented transport layer protocol that is used around the world. The TCP protocol offers a full duplex reliable virtual end-to-end connection for transporting information between endpoints by using one or more of the packets, each of which comprises both control information and data.

The mobile communication units (e.g., wireless terminals) that perform client-server communications (e.g., terminal emulation) establish a TCP connection with the server. Then, they use the connection to establish the session.

When a connection is established between a client (i.e., mobile communication unit) and a server (i.e., host computer) the two machines dedicate a portion of their resources to the connection. People who use mobile communication units frequently power them OFF without logging out or move them out of communication range, an action that would inform the server that the connection will not be used and permit it to recover the resources that it has dedicated to the connection. To avoid this problem, servers (i.e., host computers) are often configured to employ a mechanism deemed a "keepalive" probe." The keepalive probe consists of several IP packets, sent in a burst, by the server. The probe determines if the client (mobile communication unit) is still connected to the LAN and operational. The IP packets of keepalive probes differ from ordinary IP packets in that they do not increment a sequence number that synchronize the transfer of bytes in a data stream between the two end points as a convention packet using the TCP protocol would. In this manner, such IP packet is 'invisible' or 'transparent'. Generally, the IP packet sequence number is one less than the number that the receiving node expects to receive. This has two effects: (1) the receiving node will immediately return an acknowledgment packet to the sender; and (2) the IP packet does not advance the sequence number of the receiving node and therefore it does not change the synchronization state between the two end points.

When a server, that has activated the keepalive feature, does not receive a data packet for a period of time called the "keepidle time," it will send a keepalive probe to the mobile communication unit to assess continued activity. Upon receiving a keepalive message, the mobile communication unit, if active, returns an acknowledgment packet. The server is configured to end its connection with the mobile communication unit when none of the packets in the keepalive probe are acknowledged. Of course the mobile communication unit will not realize the server ended this connection until the mobile communication unit next attempts to communicate with the server.

If the mobile communication unit acknowledges one of the packets in the probe, the server will determine that the mobile communication unit is still active and reset its keepidle timer, thus maintaining the current connection. However, if none of the packets in the keepalive burst are acknowledged, the server will terminate the connection. This typically causes an application program running on the server to end its session with the mobile communication unit.

However, oftentimes workers using mobile communication units (i.e., clients) lay down the mobile communication unit in order to perform another activity or simply place the mobile communication unit in a sleep state in order to conserve battery power. In many of these situations, the worker still desires to maintain the current session so that when he returns to the mobile communication unit or reactivates it, he/she can immediately continue the session he/she was engaged in. Further, in many instances the mobile communication unit may inadvertently or purposefully be taken out of communication range of any access point which establishes a communication link to the server. Unfortunately, as mentioned above, the server will drop the current connection and session if it sends a keepalive probe to the mobile communication unit and it doesn't receive any acknowledgments. When the mobile communication unit is placed in a sleep mode or is out of range, it is unable to receive and acknowledge the keepalive probe, and therefore the current session may be prematurely ended. In many existing systems, the amount of time a server allows before ending a connection may be relatively short as the server was not configured to handle the problems now encountered with mobile communication units.

In light of the above, there is a strong need in the art for a way to maintain a connection and session between the server and the mobile communication unit when the mobile communication unit is in a low power (i.e., sleep) mode or out of range. In particular, there is a strong need in the art for a mobile communication unit which is able to prevent the host computer from prematurely ending the current connection and session while the mobile communication unit is in a sleep mode and increase the amount of time the mobile communication unit can be out of communication range with the server prior to the connection and session being dropped.

SUMMARY OF THE INVENTION

The present invention provides for managing client/server connections in a wireless environment. In accordance with the invention, a mobile communication unit (i.e., client), deploys keepalive packets at predetermined intervals in order to reset a keepidle timer of a server (e.g., a host computer). By resetting the keepidle timer, a keepalive probe to be sent by the server is delayed for a desired period of time. In this way, a connection and session between the mobile communication unit and server can be maintained as long as desired even when the mobile communication unit is in a power suspend mode. When in a power suspend mode, the mobile communication unit can briefly awake long enough to activate its transmitter and send a keepalive packet to the server to maintain the current session. In this manner, the mobile communication unit can obtain the power savings of being in primarily a power suspend mode, but still prevent the current session from timing out. Further, during awake periods when no communication is occurring between the mobile communication unit and the server, the mobile communication may periodically transmit keepalive packets so that, in the event the mobile communication unit temporarily roams out of communication range; the keepidle timer in the server will have been recently reset.

For purposes of this invention and the accompanying claims, it is to be understood that the phrase "registered to a communication network", "registered to the backbone" and the like, includes the mobile communication unit being registered to an access point or base station and therefore being able to communicate with devices coupled to the network such as a server. Such registration is understood to remain constant even if the mobile communication device roams from cell to cell. Moreover, it is to be understood that the terms "mobile communication unit", "mobile device", "mobile terminal", "PTC", "wireless terminal" and "client" are used interchangeably throughout the specification and/or claims. Likewise, the terms "host computer", "host" and "server" are employed interchangeably throughout the specification and/or claims. Furthermore, it will be appreciated that the present invention may use a "base station" and/or an "access point", and these terms are used interchangeably throughout the specification and claims to represent a device used as an intermediary between the mobile communication unit and the host computer.

According to one aspect of the present invention, a method for maintaining a connection between a network device and a mobile communication unit is provided, including the steps of: commencing a connection between the network device and the mobile communication unit, the network device ending the connection if no communication is received from the mobile communication unit for a predetermined period of time, and transmitting at least one keepalive packet from the mobile communication unit to the network device, the at least one keepalive packet serving to reset the predetermined period of time so that the network device does not end the connection.

In accordance with another aspect of the present invention, a mobile communication unit for use in a communication system is provided, the communication system including a backbone and a network device coupled to the backbone, the network device having a predetermined period of time during which, if no communication is received from the mobile communication unit, the network device ends an established connection with the mobile communication unit, the mobile communication unit including: a processor operative to control the mobile communication unit; a transmitter coupled to the processor, the transmitter operative to transmit information to the network device upon a connection being established between the mobile communication unit and the network device; and wherein the processor of the mobile communication unit transmits a keepalive packet to the network device, the keepalive packet serving to reset the predetermined period of time such that the network device does not end the established connection.

According to yet another aspect of the present invention, a communication system is provided, including: a network backbone; a server coupled to the network backbone, the server determining if no communication from a mobile client is received for a predetermined period of time and, in the event no communication is received for the predetermined period of time, the server ending a connection with the mobile client; and wherein the mobile client transmits a keepalive packet to the server, the keepalive packet serving to reset the predetermined period of time so that the server does not end the connection.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the drawings:

FIG. 9 is a flow diagram of the transfer of stack information for packets transmitted between the mobile communication unit and the server in accordance with the present invention.

DESCRIPTION OF THE PREFERRED EMBODIMENTS

Figure 1:
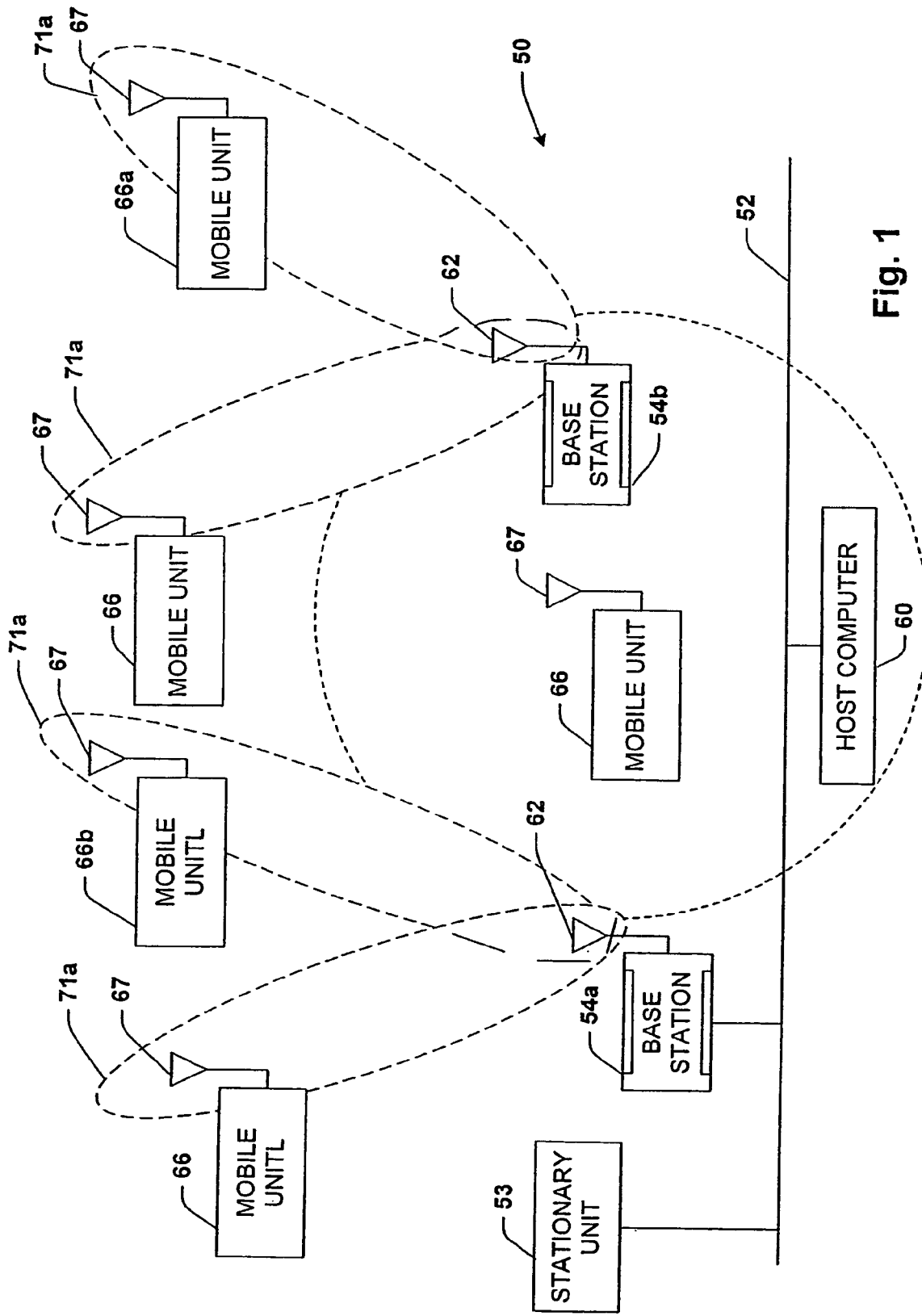
FIG. 1 is a system diagram of a network communication system in accordance with the present invention.

The present invention will now be described with reference to the drawings, wherein like reference numerals are used to refer to like elements throughout.

As mentioned above, the present invention provides for managing client/server connections in a wireless environment. In accordance with the invention, a mobile communication unit (i.e., client), deploys keepalive packets at predetermined intervals in order to reset a keepidle timer of a server (i.e. a host computer). By resetting the keepidle timer, a keepalive probe to be sent by the server is delayed for a desired period of time. In this way, a connection, and therefore a session, between the mobile communication unit and server can be maintained as long as desired even when the mobile communication unit is in a power suspend mode. When in a power suspend mode, the mobile communication unit can briefly awake long enough to activate its transmitter and send a keepalive packet to the server to maintain the current session. In this manner, the mobile communication unit can obtain the power savings of being in primarily a power suspend mode, but still prevent the current connection from timing out. Further, by periodically sending keepalive packets even while in an awake state, the mobile communication unit can significantly increase the amount of time it can roam outside of communication range since the keepalive packet will serve to periodically reset the keepidle timer even during times when no communication is occurring.

The present invention is applicable to cellular communication systems which include mobile communication units that can roam from cell to cell. Such mobile communication units can be data terminals, telephones, pagers, etc. In the exemplary embodiment described hereinafter, the mobile communication unit is a mobile data terminal used to communicate data such as inventory or the like. However, it is recognized that the invention contemplates other types of mobile devices and is not intended to be limited to systems using mobile data terminals.

Referring now to FIG. 1, a cellular communication system 50 is shown in accordance with an exemplary embodiment of the present invention. The cellular communication system 50 includes a network backbone 52. The network backbone 52 may be a hardwired data communication path made of twisted pair cable, shielded coaxial cable or fiber optic cable, for example, or may be wireless or partially wireless in nature. Coupled to the network backbone 52 are a stationary communication unit 53 and several base stations 54. Only one base station $54_a$ is shown hardwired to the network backbone 52, however, it is understood that more than one hardwired base station $54_a$ may be physically connected to the network backbone 52. The base stations 54 may be hardwired to the network backbone 52 such as base station $54_a$ or may wirelessly couple to the backbone 52 such as base station $54_b$.

Each base station 54 serves as an entrance point through which wireless communications may occur with the network backbone 52. The wireless base station $54_b$ may be employed to expand the effective communication range of the cellular communication system 50. As is conventional, each wireless base station $54_b$ associates itself, typically by registration, with another base station or a host computer 60 coupled to the network backbone 52, whether hardwired or wireless, such that a link is formed between itself and other devices situated on the network backbone 52. Although the present invention is primarily described herein using base stations 54, it will be appreciated that access points may be used in lieu of base stations to carry out the present invention. Accordingly, the terms "base station" and "access point" are used interchangeably throughout the specification and claims.

Each base station 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each base station 54 defines a region of coverage in which successful wireless communications may occur. Depending on the type of antenna 62 selected and output power of the respective base station 54, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network backbone 52 via a selected base station 54 and/or with other mobile communication units. Upon roaming from one cell to another, the mobile communication unit 66 is configured to associate itself with a new base station 54. A mobile communication unit 66 registers with a particular base station which provides the particular mobile communication unit 66 with wireless access to the network backbone 52. The manner in which each of the mobile communication units 66 are registered with a particular base station 54 is discussed in more detail below in connection with FIG. 4.

Figure 2A:
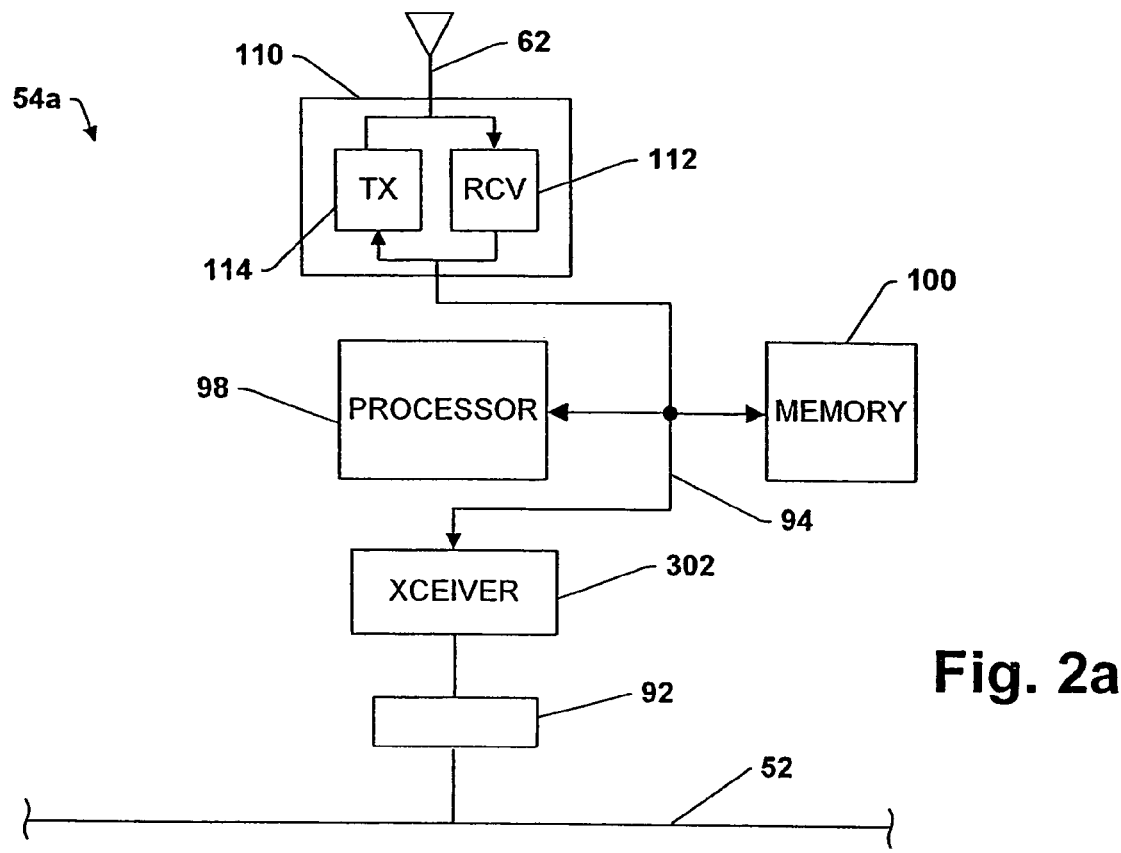
FIG. 2A is a block diagram of a hard wired base station in accordance with the present invention.

FIG. 2A is a block diagram representative of each hardwired base station $54_a$. Each hardwired base station $54_a$ is connected to the network backbone 52 via a connector 90 such as a DB-9 or RJ-45 connector. The connector 90 is connected to the network backbone 52 at one end and to a network adapter transceiver 92 included in the base station $54_a$ at the other end. The network adapter transceiver 92 is configured according to conventional adapter transceiver techniques to allow the base station $54_a$ to communicate over the network backbone 52. The network adapter transceiver 92 is also connected to an internal bus 94 included within the base station $54_a$. The base station $54_a$ further includes a processor 98 connected to the bus 94 for controlling and carrying out the operations of the base station $54_a$. The processor 98 may include any of a variety of different microprocessors, such as the Motorola 68360 or Intel 80486 microprocessors. It is understood that any suitable processor capable of carrying out the herein described functions of the base stations $54_a$ may be used and falls within the scope of this invention.

The base station $54_a$ also includes a memory 100 connected to the bus 94. The memory 100 stores program code executed by the processor 98 for controlling the other elements within the base station $54_a$ to carry out the functions described herein. It will be readily apparent to a person having ordinary skill in the art of microprocessor programming how to program the processor 98 to carry out the operations described herein using conventional programming techniques based on the flowcharts/flow diagrams and descriptions provided herein. Accordingly, additional detail as to the specific program code has been omitted. The memory 100 also serves to buffer packets of information such as those received over the network backbone 52 or those transmitted to or received from the mobile communication units 66 or wireless base stations $54_b$. Furthermore, the memory 100 may store tables relating to which of the mobile communication units 66 are registered to the network backbone 52 and/or the identification codes of the mobile communication units 66.

Also connected to the bus 94 is a radio frequency (RF) section 110 included in the base station $54_a$. The RF section 110 includes the aforementioned antenna 62 for receiving radio signals from and transmitting radio signals to mobile communication units 66 and wireless base stations $54_b$ (FIG. 2B) within the cell area of the base station $54_a$. Information transmitted from a mobile communication unit 66 or a wireless base station $54_b$ is received via the antenna 62 and is processed by an RF receiver 112 which is connected to the bus 94 and demodulates and decodes the signal and converts the signal to a digital signal having a packet format as discussed below in connection with FIG. 4. The processor 98 controls an RF transmitter 114 included in the RF section 110, the RF transmitter also being connected to the bus 94. The processor 98 causes the RF transmitter 114 to modulate and transmit an RF signal which in turn carries the information packet (FIG. 4) to the appropriate mobile communication unit 66 or wireless base station $54_b$. Thereafter, the processor 98 in the base station $54_a$ stores the packet in the memory 100 until such time as the base station $54_a$ is able to transmit the information packet onto the network backbone 52 via the network adapter transceiver 92 and connector 90.

Figure 2B:
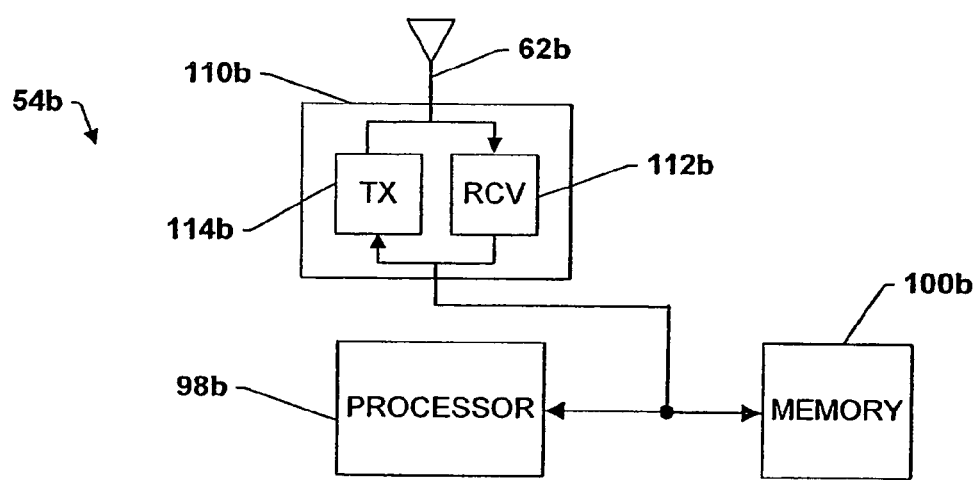
FIG. 2B is a block diagram of a wireless base station in accordance with the present invention.

FIG. 2B is a block diagram representative of each wireless base station $54_b$ in the system 50. For the most part, the construction and operation of the components within the wireless base station $54_b$ are identical to those described with respect to the base stations $54_a$. Hence, similar components are denoted simply by the addition of a [b]. For example, the processor 98 in the base station $54_a$ is equivalent to the processor $98_b$ in the wireless base station $54_b$. However, the wireless base station $54_b$ is not connected directly to the network backbone 52 and therefore does not include a network transceiver 92 or connector 90 as in each base station $54_a$. Rather, the wireless base station $54_b$ communicates with mobile communication units 66 registered thereto and with the particular base station with which the wireless base station $54_b$ is associated with via the RF section $110_b$.

Operations of the two base stations $54_a$ and $54_b$ are primarily the same with the exception of the particular procedures described herein. As mentioned above, the wireless base stations $54_b$ function to extend the relative cell coverage of a given base station $54_a$, and serve primarily to relay information between the base stations 54a connected to the network backbone 52 and the mobile communication units 66.

Figure 2C:
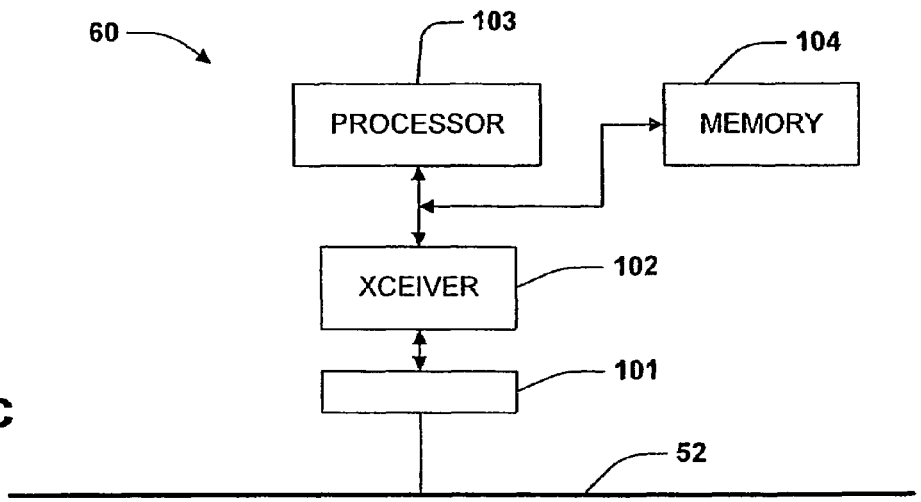
FIG. 2C is a block diagram of a server in accordance with the present invention.

FIG. 2C is a block diagram representative of the server (e.g. host computer) 60 of the present invention. Although operations performed by the server 60 are conventionally different than the operations of a base station 54, the hardware components are similar to those hardware components described with respect to base station $54_a$ in FIG. 2A. Hence, the function and interconnection among the hardware components will not be described again in detail. Rather, as shown in FIG. 2C, similar to base station $54_a$, the server 60 includes a backbone connector 101, a transceiver 102, a processor 103 and a memory 104. Unlike the base stations 54, however, the server 60 of this particular embodiment does not include an RF section 110. Thus, in order for the server 60 to communicate with any mobile communication unit 66, the server 60 must route all such communication over the backbone 52 and through one of the base stations 54. Similarly, for a mobile communication unit 66 to communicate with the server 60, the mobile communication unit 66 must first access the network backbone 52 through one of the existing base stations 54 which will then ensure the communication is properly delivered to the server 60.

The server 60 serves as a central unit where large operational based and application based software programs are stored and executed in order to provide the necessary functions which the communication system 50 was installed to perform.

Figure 3:
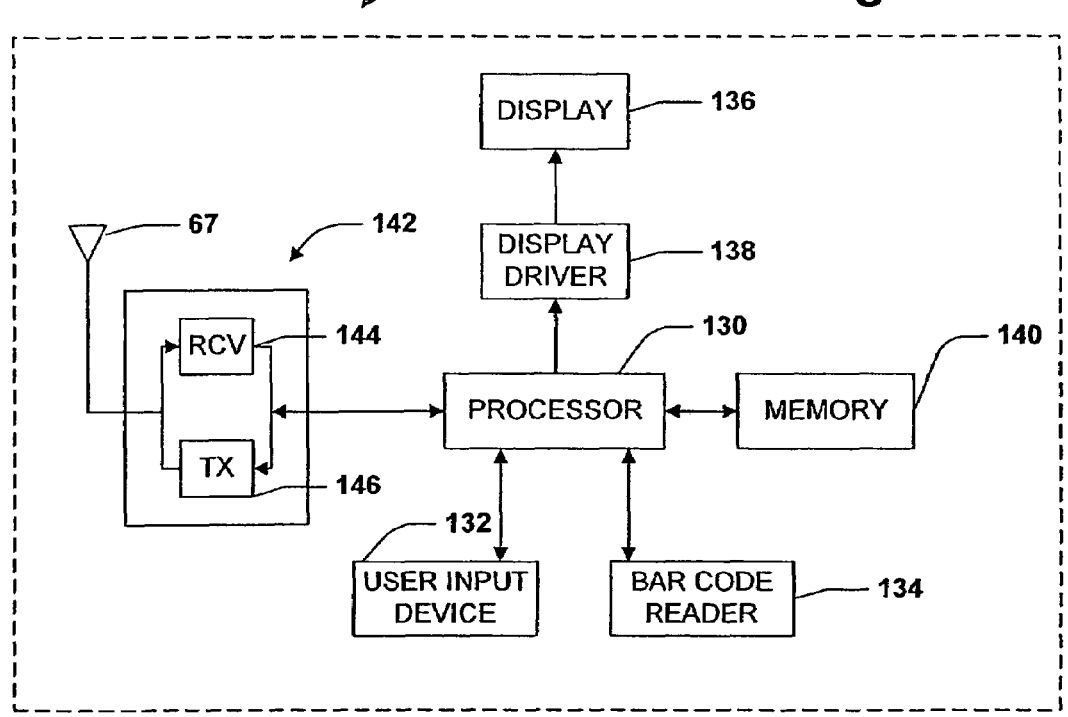
FIG. 3 is a block diagram of a mobile communication unit in accordance with the present invention.

FIG. 3 is a block diagram representing the basic structure of each mobile communication unit 66 according to the exemplary embodiment. Each mobile communication unit 66 includes a processor 130 which can be programmed to control and operate the various components within the mobile communication unit 66 in order to carry out the various functions described herein. The processor 130 has coupled thereto a user input device 132 which allows a user to input data to be communicated to the network backbone 52 such as inventory data, patient information, etc. This information may be sent to the server 60 which serves as a central data location, for example, or to a cash register connected to the network backbone 52, and another example, for providing price information. The input device 132 can include such items as a keypad, touch sensitive display, etc.

The mobile communication unit 66 also may include a bar code scanner 134 coupled to the processor 130 serving as another form of data input. A display 136 is connected to and controlled by the processor 130 via a display driver circuit 138. The display 136 serves as a means for displaying information stored within the mobile communication unit 66 and/or received over the network backbone 52 via a base station 54. The display 136 can be a flat panel liquid crystal display with alpha-numeric capabilities, for example, or any other type of display as will be appreciated.

A memory 140 is included in each mobile communication unit 66 for storing program code executed by the processor 130 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 140 also serves as a storage medium for storing information packets received from or intended to be transmitted to a base station 54 as discussed herein. Furthermore, the memory 140 stores an identification code which is used to designate and distinguish the mobile communication unit 66 from the other mobile communication units 66 registered to the network backbone 52 and/or within the system 50.

Each mobile communication unit 66 also includes its own RF section 142 connected to the processor 130. The RF section 142 includes an RF receiver which receives the RF transmissions from a base station 54 via an antenna 67 and demodulates the signal to obtain digital information modulated therein. The RF section 144 also includes an RF transmitter 146. In the event the mobile communication unit 66 is to transmit information to the network backbone 52 in response to an operator input at input device 132, for example, the processor 130 forms within the memory 140 an information packet including data together with a source address (i.e., the address of the particular mobile communication unit 66 sending the information) and a destination address (e.g., the server 60 or other network device). The information packet is then delivered to the RF transmitter 146 which transmits an RF signal with the information packet modulated thereon via the antenna 67 to the base station 54 with which the mobile communication unit 66 is registered.

Like the antenna 62 of the base station, the antenna 67 of the mobile communication units may be of any type suitable for use in a network cellular communication system, such as an omni-directional antenna, a yagi-type antenna, etc. A geographic cell 71 associated with each mobile communication unit 66 defines a region of coverage in which successful wireless communications may occur. Depending on the type of antenna 67 selected and output power of the respective mobile communication unit 66, the geographic cell may take one of several different forms and sizes. For example, the antenna 67 could be an omni-directional antenna if a generally spherical cell area $71_b$ of coverage is desired. A directed yagi-type antenna could be used as the antenna 67 for a more directed elliptical cell area $71_a$ of coverage.

Figure 4:
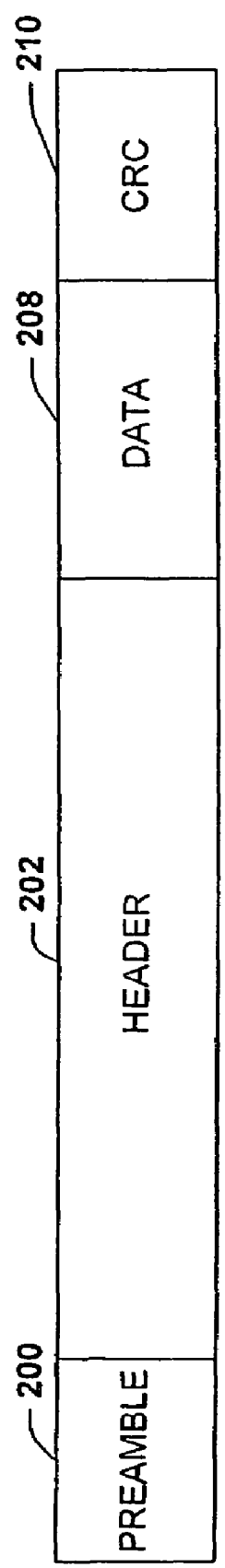
FIG. 4 is a schematic diagram representing an exemplary format for information packets which are communicated between devices in the cellular communication system in accordance with the present invention.

Referring briefly to FIG. 4, an exemplary format for frames sent between a mobile communication unit 66 and a base station 54 is shown. Each frame includes a number of fields such as a preamble field 200, a header field 202 (including a source address field, and a destination address field), a data field 208, and an error detecting field (CRC) 210, for example. The preamble field 200 includes synchronizing bits which allow a device receiving the frame an opportunity to "sync" to the frame as is conventional. The header field 202 follows the preamble field 200 and also may include information such as the length, type of the packet and a temporary address or identification code assigned by the server 60 (discussed in greater detail below). For example, the header field 202 may indicate whether the frame is a type which requires a response from the receiving device.

The data field 208 in the frame includes various information intended to be communicated to the receiving device i.e. accruing in a conventional manner. The frame ends with a cyclical redundancy code (CRC) field 210 which serves as an error detecting field according to the conventional techniques such that a receiving device can determine if it has properly received the packet.

Figure 5:
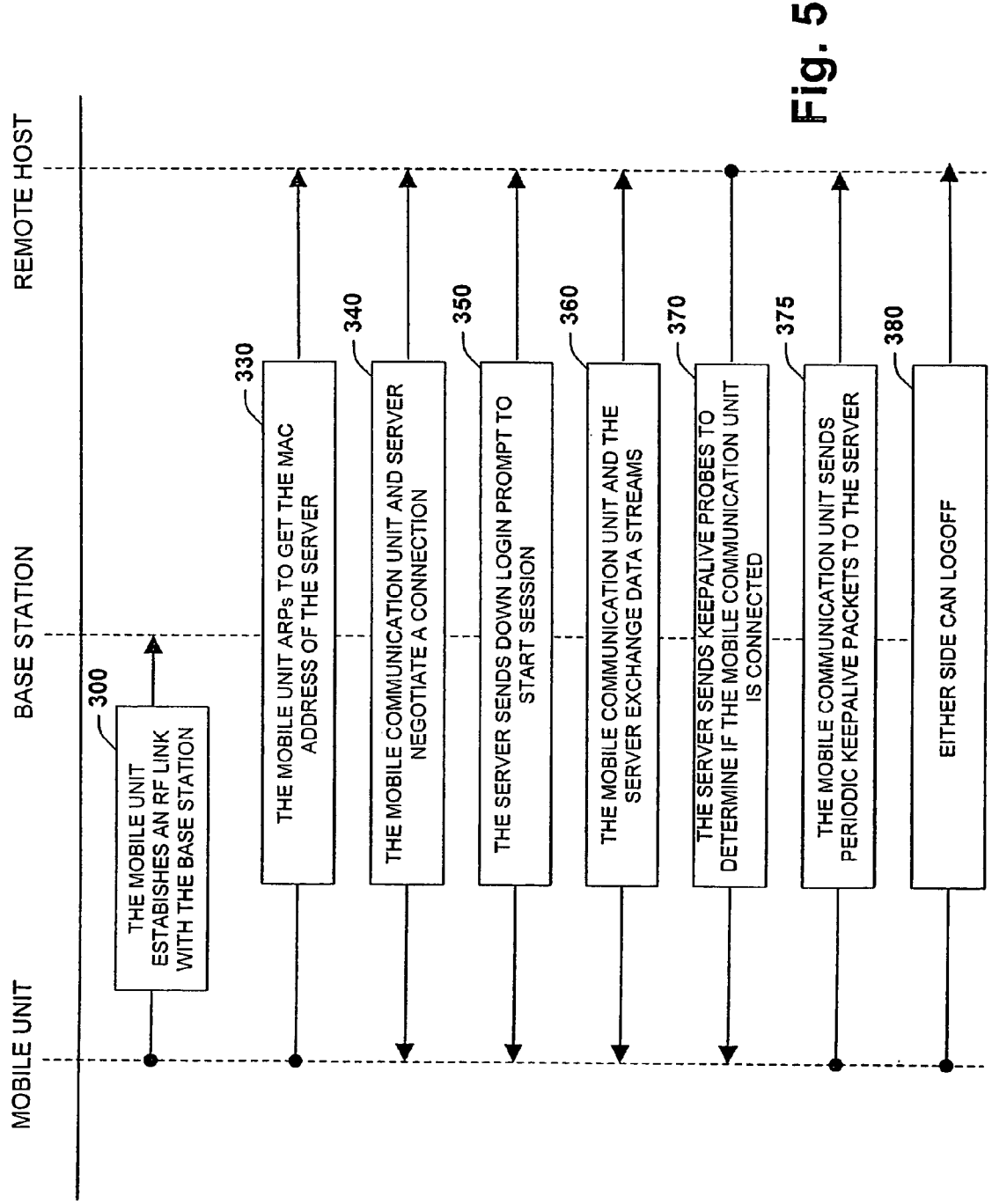
FIG. 5 is a flow diagram representative of a communication session between the mobile communication unit and the server in accordance with the present invention.
Figure 6:
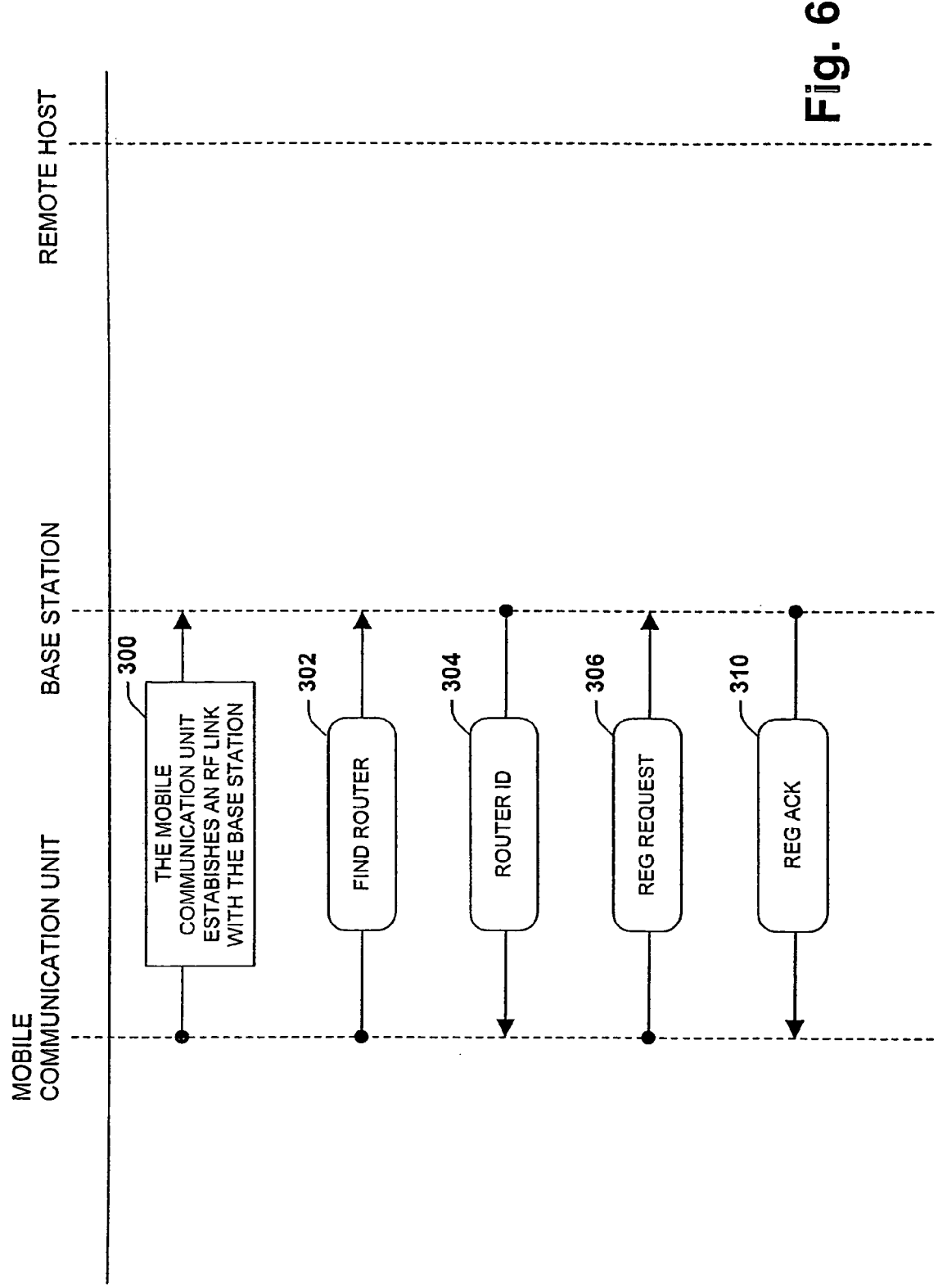
FIG. 6 is a flow diagram of the establishment of a RF link in accordance with the present invention.

Turning now to FIGS. 5 and 6, the establishment of a basic session such as, for example, a Telnet session in accordance with the present invention is described. The Telnet session is established by a series of well defined communication events. First in step 300, the mobile communication unit 66 establishes a radio link with a base station 54. The radio link is established with the base station 54 so that data can be transferred to the backbone 52 of the LAN. The establishment of the radio link includes the steps of registration as shown in FIG. 6. Thus, as shown in step 302 of FIG. 6, the mobile communication unit 66 first sends a find router frame to the base station 54. Thereafter, in step 304, the base station sends back a router identification (ID) frame. In step 306, the mobile communication unit 66 sends the base station 54 a registration request frame. The base station 54 in step 310 thereafter acknowledges the registration request frame to the mobile communication unit 66.

After the mobile communication unit 66 is registered, the base station 54 will buffer broadcast and unicast frames, from the wired LAN, that are directed to the mobile communication unit 66. When a mobile communication unit 66 sends data to the LAN, in order to communicate with another station on the LAN, it creates a complete Ethernet frame including the source and destination fields, the ether type and the data field. It sends this frame to the base station 54 where it will be bridged to the LAN.

The base station 54 is selective about which of the frames from the mobile communication unit 66 it will bridge to the LAN. Most of the frames that establish and control registration of the mobile communication unit 66 to the base station 54 are restricted to the radio link.

Figure 7:
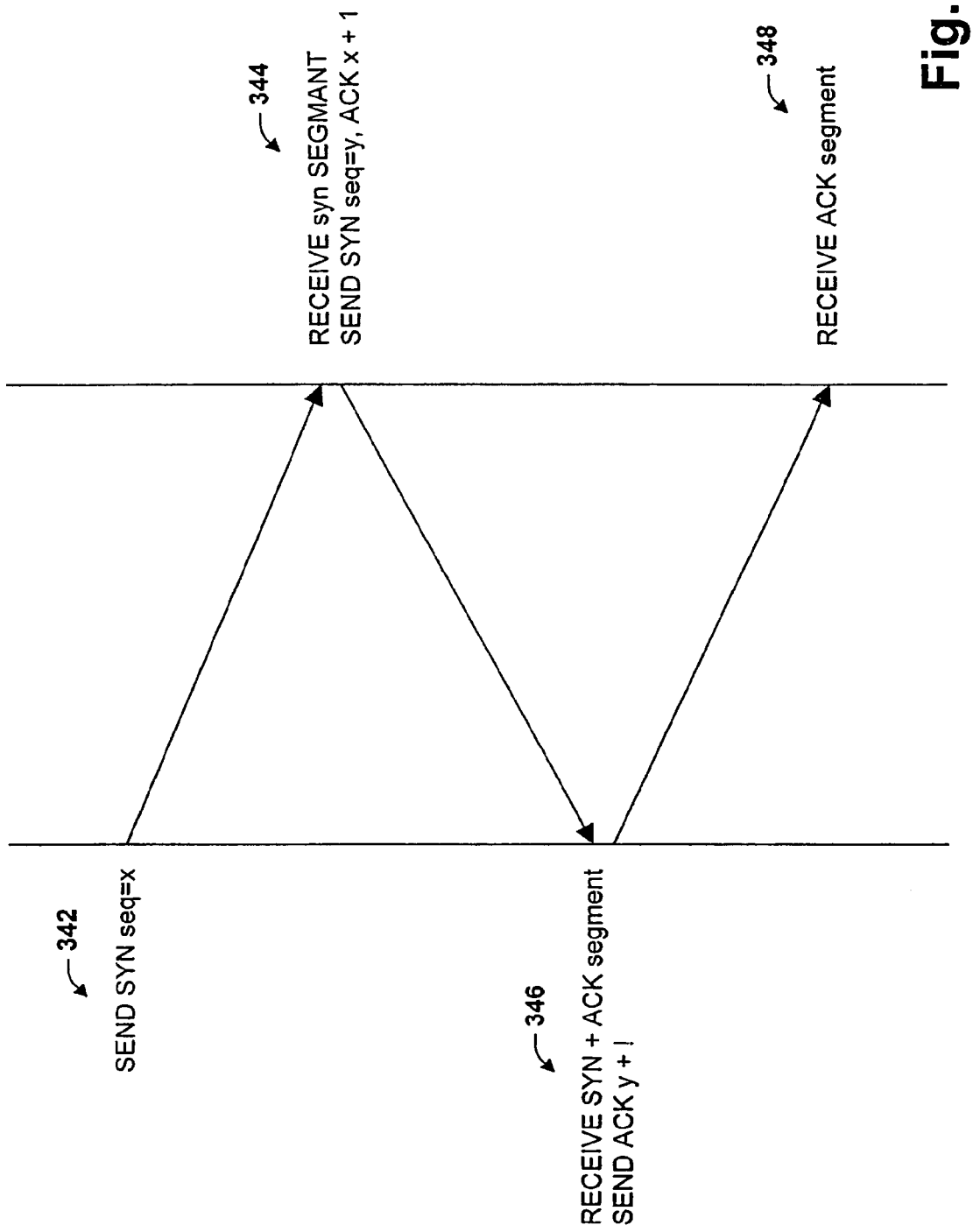
FIG. 7 is a flow diagram representative of the mobile communication unit and server establishing a TCP connection.

Returning back to FIG. 5, after step 300, the mobile communication unit 66 in step 330 ARPs (employs an address request protocol) to retrieve a link layer address for the server 60 so it can establish a TCP connection with the server 60. Next in step 340, the mobile communication unit 66 starts a negotiation process by which the mobile communication unit 66 and the server 60 exchange queries and responses and agree upon a set of parameters which allows them to interpret each others data format and commands. This process is shown in FIG. 7. More particularly, turning now to FIG. 7, in order to establish a TCP connection, the mobile communication unit 66 and server 60 exchange packets that initialize the packet sequence numbers that each end-point uses to synchronize the transfer of bytes in the data stream. As shown in step 342, the mobile communication unit 66 begins the connection sequence by sending an IP synchronization (SYN) packet (SEND SYN seq=x) server 60. After receiving the SYN segment, the server 60 in step 344 returns an acknowledgment-synchronization packet (ACK-SYN) to the mobile communication unit 66. The mobile communication unit 66 in step 346 sends back an acknowledgment (ACK) packet to the server 60 which is received in step 348. In general, TCP connections can be made from either end or simultaneously, but the connection for a Telnet session is typically started by the mobile communication unit 66. This is important for wireless terminals such as the mobile communication units 66 because they are registered to the network and are reachable for several minutes after starting a connection.

When they have completed negotiation, a connection is established and the server 60 sends down in step 250 (FIG. 5) a login prompt to the mobile communication unit 66 the user can login and start a session. Following the login, a session is started between the mobile communication unit 66 and the server 60 and as shown in step 360 data can be exchanged. As is conventional, the server 60, in step 370, will send keepalive probes to the mobile communication unit 66 if no communication is received from the mobile communication unit before the keepidle timer expires. The keepalive probes are sent periodically for a fixed period of time after the keepidle timer expires. If no acknowledgments or other communication is received in a predetermined period of time thereafter, the server 60 ends the connection. The predetermined period of time consists of the time set in the keepidle timer plus a fixed period of time thereafter which corresponds to the time it takes the server 60 to send keepalive probes and wait for acknowledgments. Of course, the predetermined period of time could be any other period of time that the server 60 sets before the connection is terminated.

In conventional systems, if the mobile communication unit 66 is powered down or out of range and doesn't acknowledge the keepalive probe, the server 60 will drop the connection after the predetermined period of time. Unlike conventional systems, the present invention provides for maintaining the current connection when the mobile communication unit 66 is in a powered down mode and extending the time the mobile communication unit can be out of range. Thus, in step 375 the mobile communication unit 66 periodically transmits a keepalive packet 390 (FIG. 8) which functions in substantially the same manner as an acknowledgment to the server 60 to a keepalive probe.

The keepalive packets may be transmitted regardless of whether the mobile communication unit 66 is actively communicating with the server 60 at that time or not. In addition, the mobile communication unit may be configured to transmit at least one keepalive packet just prior to its entering a reduced power of sleep mode. This would maximize the amount of time the mobile communication unit 66 could remain in a full sleep mode before the server 60 would begin probing again (using keepalive probes) to determine if the mobile communication unit is still there. Further, the mobile communication unit 66 could also be configured to periodically awaken from its sleep mode to transmit a keepalive packet to the server 60 so as to reset the predetermined period of time allowed before the server 60 ends the connection with this particular mobile communication unit 66. The purpose of the keepalive packet sent from the mobile communication unit 66 may solely or primarily be to reset the predetermined period of time allowed by the server 60 for a given connection. By saying that the keepalive packet is primarily being used to reset the predetermined period of time, it is meant that the keepalive packet may in some cases also be used to perform other dedicated functions by, for example, setting or resetting flag bits in the keepalive packet even though the keepalive packet would still not include any actual data to be transmitted to the server 60.

Since the server 60 typically resets its keepidle time for a particular mobile communication unit 66 upon receiving any type of packet from the mobile communication unit, by the mobile communication unit 60 periodically sending its own keepalive packet 390 to the server 60 the keepidle time and the predetermined period of time is also reset. With respect to the present invention and the accompanying claims, the phrase "resetting the predetermined period of time" or the like is meant to include increasing the amount of time available before a connection is ended by the server 60 (or other network device) by any amount, even if this amount of time is not the full amount of time to which it could have been reset. Finally in step 380, it is shown that either side could log off and end the existing session.

As mentioned above, keepalive probes test the integrity of a TCP connection after it has been established. The TCP protocol does not provide for checking a connection when it is not being used. It is possible for a machine using the TCP/IP protocols to establish a stream connection (i.e., TCP) and then not use the connection for days—yet the connection will remain up. This is efficient for communications, but the machines must allocate valuable resources for the connections and to maintain state information about each other. Keepalive probes are a mechanism to check the connection between the processes without changing their state information. Keepalive probes are generally implemented by the server 60 to check for the existence of a client (i.e., mobile communication unit 66). In general, any process can activate keepalive probes for a TCP connection.

A keepalive probe consists of several packets. Each packet has a length of 0 or perhaps a single byte. Such packets use a sequence number 1 less than the number that the destination has most recently acknowledged. This causes the destination to acknowledge the packet and also to throw the packet away. It also maintains the synchronization numbers of the data packets. One method to detect such packets is to compare the sequence numbers of the 0-1 byte IP packets in a stream with the number of the last packet sent when packet flow stopped. The packets in a series, if there is no intervening data packet traffic, will use the same sequence number for every packet.

Figure 8:
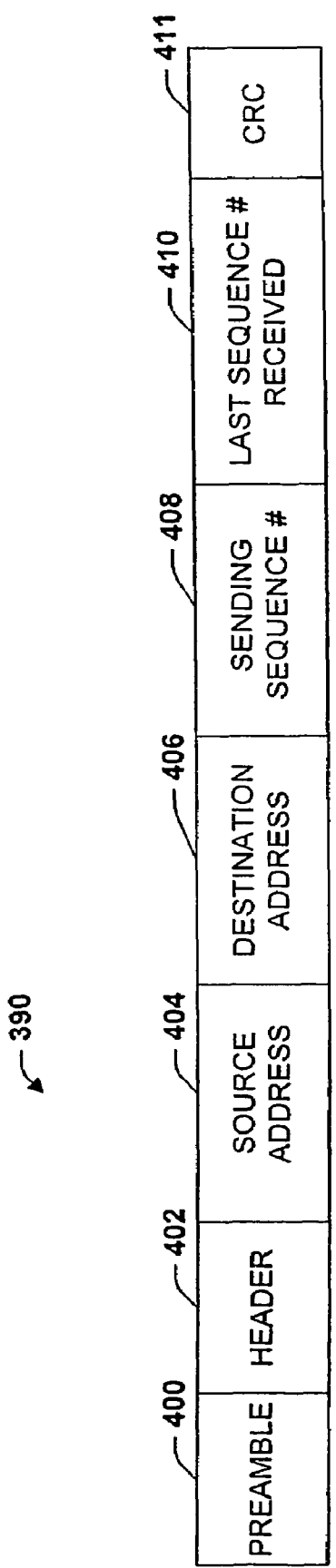
FIG. 8 shows an exemplary format for keepalive packets sent between the server and the mobile communication unit in accordance with the present invention.

FIG. 8 shows an exemplary format for keepalive packets 390 sent between the mobile communication unit 66 and host computer 60 in the system 50 is shown. Each packet 390 includes a number of fields such as a preamble field 400, a header field 402, a source address field 404, a destination address field 406, a sending sequence number (#) field 408, and a last sequence # received field 410, for example. The preamble field 400 includes synchronizing bits which allow a device receiving the packet 390 an opportunity to "sync" to the packet 390 as is conventional. The header field 402 follows the preamble field 400 and includes information such as the length, type of the packet and a temporary address or identification code assigned by the server 60 (discussed in greater detail below). For example, the header field 402 may indicate whether the packet is a type which requires a response from the receiving device. The source address field 404 follows the header field 402 and includes an address of the device from which the packet originated.

Following the source address field 404, the packet 390 includes a destination address field 406 which holds the address of the device to which the packet 390 is ultimately destined.

After the destination address field 406, the packet 390 includes the sending sequence # field 408 which is used to keep track of the number of bytes being transferred. The sending sequence # field 408 includes the sending sequence number one less than it should be. For example if the sending sequence number is 150, the sending sequence number sent via the keepalive packet 390 will be 149. Server 60 that handle TCP/IP are configured such that if the server 60 receives a packet 390 with a sequence # less than what is expected, the server 60 will acknowledge the packet 390 as mentioned above.

Following the sending sequence # field 408 is a last sequence # received field 410 which is compared by the destination device against the last sequence # sent. If the last sequence # received does not correspond to the last sequence number sent between the two devices, then the destination device knows that the other device did not receive the last package sent. Finally, a CRC field 411 is also included as part of the packet 390.

Turning now to FIG. 9, a flow diagram of the transfer of stack information for packets 390 transmitted between the mobile communication unit 66 and server 60 is shown. In the keepalive packet headers 402, the mobile communication unit 66 will choose a random number (e.g., 100) to start with, which is used as a random start number. The mobile communication unit 66 whenever it sends a packet 390 to the server 60 will include a number representative of the random start number plus the number of bytes of data that it is sending to the server 60 inside the keepalive packet 390. With respect to the last sequence # field there is, preliminarily to the mobile communication unit 66 and server 60 doing real communication, a series of event that occurs where the mobile communication unit 66 tells the server 60 what its starting sequence number is and the server 60 will tell the mobile communication unit 66 what its starting sequence number is.

Generally, the keepalive packet sequence number is one less than the number that the receiving device (e.g., server 60) expects to receive. This has two effects: (1) the server 60 will immediately return an acknowledgment packet to the sender (e.g., mobile communication unit 60); and (2) the keepalive packet 390 does not advance the sequence number of the receiving device (e.g., server 60) and therefore it does not change the synchronization state between the two devices (e.g., mobile communication unit 66 and server 60). Thus, the keepalive packet 390 is effectively transparent to the server 60.

As mentioned above, the keepalive packet 390 will include the source address 404, destination address 406, sending sequence # field 408 and last sequence # received field 410. The sending sequence number equals the last number stored in the stack 430 plus the number of bytes that is currently being transmitted. For example, if there is 50 bytes of data being transmitted and this is the first transmission, the stack 430 for packets transmitted by mobile communication unit 66 ($MU_1$) to the server 60 ($HOST_1$) would be 150 (the random start number (100) plus the number of bytes being transmitted (50)). The $HOST_1$ would update its stack to 150 so as to correspond to the last sequence number plus the number of bytes.

By each device ($MU_1$ and $HOST_1$) keeping respective TCP/IP stacks for packets transmitted and received and keeping track of the sending sequence # and last number of bytes transmitted, the devices are able to keep track of packets and know if any packets were not received by comparing the number received to what is expected. Using the TCP/IP protocol, the receiving device does not have to acknowledge receipt of a packet to the sender thus resulting in a substantial reduction in the number of packets.

It will be appreciated that server 60 will be running a plurality of stacks, each corresponding to a communication session with a particular mobile communication unit 66. The mobile communication unit 66 will have a stack for every socket connection it has.

It will be appreciated that the mobile communication unit 66 is also capable of ending the connection and/or session. As a result, the mobile communication unit 66 is programmed such that if it is roaming and thus out of range of an base station 54, the mobile communication unit 66 will cease sending keepalive packets 390. This is because if the mobile communication unit 66 is out of range and sends a keepalive probe, the destination device (i.e., server 60) will not receive and acknowledge receipt of the keepalive probe. If the mobile communication unit 66 sent out a keepalive probe and acknowledgment is not received, the mobile communication unit 66 may end the current session. Thus, if the mobile communication unit 66 begins to roam, it will stop sending keepalive packets 390.

Accordingly, by the mobile communication unit 66 being able to deploy keepalive packets 390 at predetermined intervals, the keepidle timer of the server 60 can be reset. By resetting the keepidle timer, the keepalive probe to be sent by the server 60 is delayed for a desired period of time. Consequently, the current session between the mobile communication unit 66 and server 60 is maintained as long as desired even when the mobile communication unit 66 is placed in a power suspend mode. When in a power suspend mode, the mobile communication unit 66 can briefly awake long enough to activate its transmitter 146 and send a keepalive packet 390 to the server 60 so as to maintain the current session. In this manner, the mobile communication unit 66 can obtain the power savings of being in primarily a power suspend mode, but still prevent the current session from ending.

The present invention includes all such equivalents and modifications, and is limited only by the scope of the following claims.

What is claimed is:

1. A computer-implemented system that facilitates management of mobile unit connections via transparent communication in a wireless environment, comprising:
 a host computer that manages connection sessions with at least one mobile unit;
 a mobile unit that establishes a connection session with the host computer and transmits a transparent keepalive packet to the host computer in order to maintain the connection session; and
 wherein the keepalive packet is based upon a sending sequence field populated with a number whose value is one less than that expected by the host computer.

2. The system of claim 1, the host computer terminates the connection session upon expiration of a keepidle timer.

3. The system of claim 2, the host computer resets the keepidle timer upon receipt of the keepalive packet.

4. The system of claim 1, the mobile unit transmits the keepalive packet at a predetermined interval.

5. The system of claim 4, the mobile unit enters a power suspend mode after the keepalive packet is transmitted.

6. The system of claim 5, the mobile unit enters an awake mode prior to the predetermined interval and transmits the keepalive packet.

7. The system of claim 1, the mobile unit transmits the keepalive packet based upon at least one of an indication that the mobile unit is entering into a power suspend mode and an indication that the mobile unit is leaving a communication range with the host computer.

8. The system of claim 1, the host server transmits an acknowledgement to the mobile unit upon receipt of the keepalive packet.

9. The system of claim 1, the keepalive packet is unsolicited.

10. A computer-implemented system that facilitates management of client/server connections via unsolicited communication in a wireless environment, comprising:
    a server that manages active sessions with at least one client;
    a mobile client device that establishes an active session with the server and transmits an unsolicited keepalive packet to the server in order to keep the session alive; and
    wherein the keepalive packet is based upon a sending sequence field populated with a number whose value is one less than that expected by the server.

11. The system of claim 10, the server ends the session upon expiration of a keepidle timer.

12. The system of claim 11, the server resets the keepidle timer upon receipt of the keepalive packet.

13. The system of claim 10, the mobile client device transmits the keepalive packet at a predetermined interval.

14. The system of claim 13, the mobile client device enters a reduced power state after the keepalive packet is transmitted.

15. The system of claim 14, the mobile client device enters a waking mode prior to the predetermined interval and transmits the keepalive packet.

16. The system of claim 10, the mobile client device transmits the keepalive packet based upon at least one of an indication that the mobile client device will enter a reduced power state and an indication that the mobile client device will leave a communication range with the server.

17. The system of claim 10, the server transmits an acknowledgement to the mobile client device upon receipt of the keepalive packet.

18. The system of claim 10, the keepalive packet is transparent to the server.

19. A computer-implemented method for conserving power in a mobile communication device while maintaining an active connection session between the mobile device and a base station, comprising:
    establishing a communication session between a mobile communication device and a base station;
    configuring the base station for terminating the communication session upon expiration of a keepidle timer;
    configuring the mobile communication device for transmitting keepalive signals to the base station at intervals prior to the expiration of the keepidle timer;
    transmitting the keepalive signal from the mobile communication device to the base station, the keepalive signal is at least one of transparent and unsolicited; and
    wherein the keepalive signal is based upon a sending sequence populated with a number whose value is one less than that expected by the base station.

* * * * *

UNITED STATES PATENT AND TRADEMARK OFFICE
CERTIFICATE OF CORRECTION

| | | |
|---|---|---|
| PATENT NO. | : 7,406,061 B2 | Page 1 of 1 |
| APPLICATION NO. | : 11/459593 | |
| DATED | : July 29, 2008 | |
| INVENTOR(S) | : Harsch | |

It is certified that error appears in the above-identified patent and that said Letters Patent is hereby corrected as shown below:

On the Title Page, in the Figure, for Tag "300", Line 2, delete "ESTABISHES" and insert -- ESTABLISHES --, therefor.

IN THE DRAWINGS

In Fig. 1, Sheet 1 of 9, at the Top Left Corner, for Tag "66", Line 2, delete "UNITL" and insert -- UNIT --, therefor.

In Fig. 1, Sheet 1 of 9, for Tag "66b", Line 2, delete "UNITL" and insert -- UNIT --, therefor.

In Fig. 5, Sheet 5 of 9, for Tag "300", Line 2, delete "ESTABISHES" and insert -- ESTABLISHES --, therefor.

In Fig. 6, Sheet 6 of 9, for Tag "300", Line 3, delete "ESTABISHES" and insert -- ESTABLISHES --, therefor.

In Column 16, Line 5, In Claim 15, delete "a waking" and insert -- awaking --, therefor.

Signed and Sealed this
Fourteenth Day of February, 2012

David J. Kappos
*Director of the United States Patent and Trademark Office*